T. C. & C. P. HARVEY.
DUMP WAGON.
APPLICATION FILED MAR. 24, 1917.

1,263,760.

Patented Apr. 23, 1918.
6 SHEETS—SHEET 1.

Fig. 1.

Witness
Louis R. Heinrichs

Inventors
Cassells P. Harvey
Theodore C. Harvey
By Perfirs M. Smith
Attorney

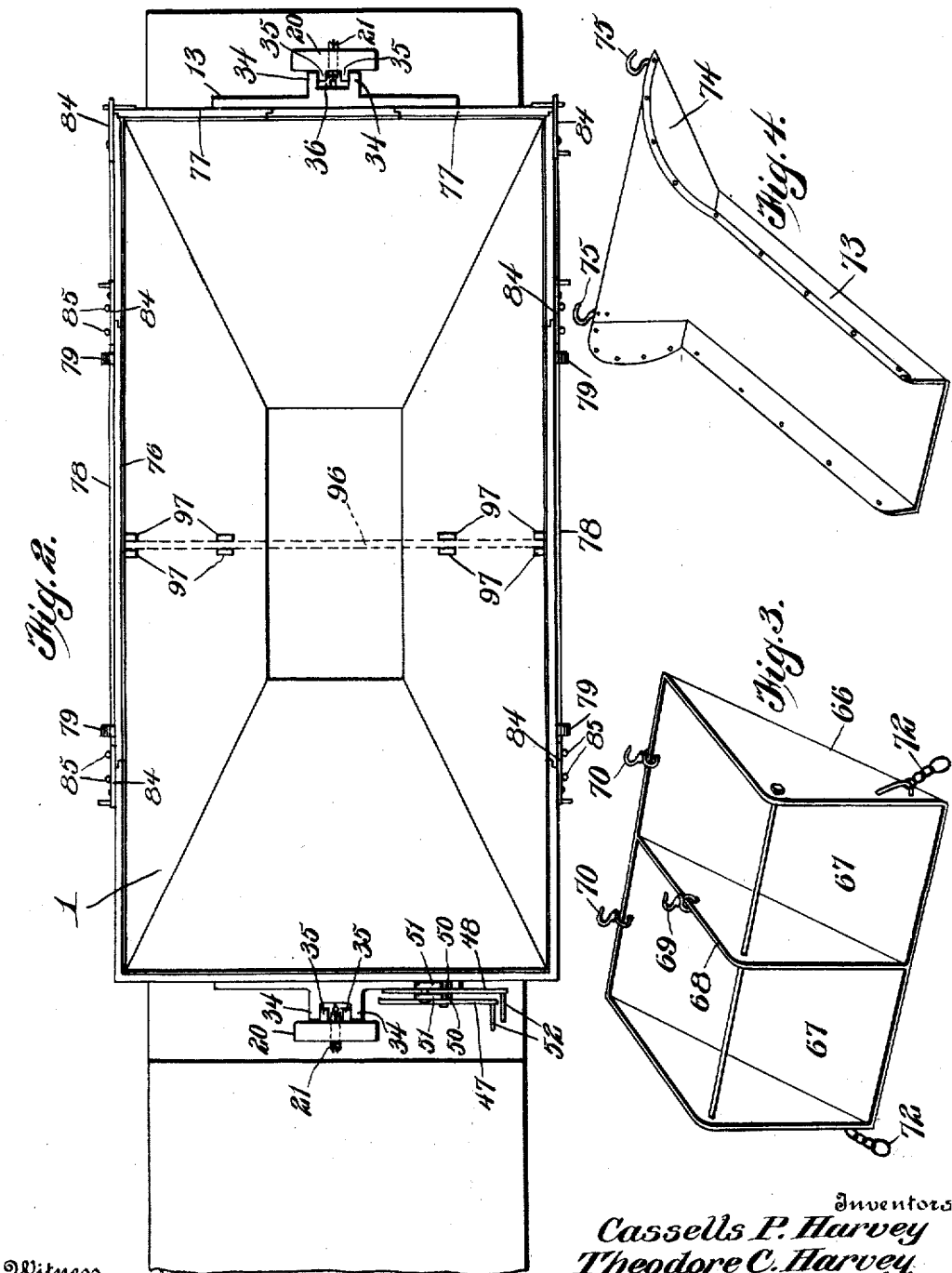

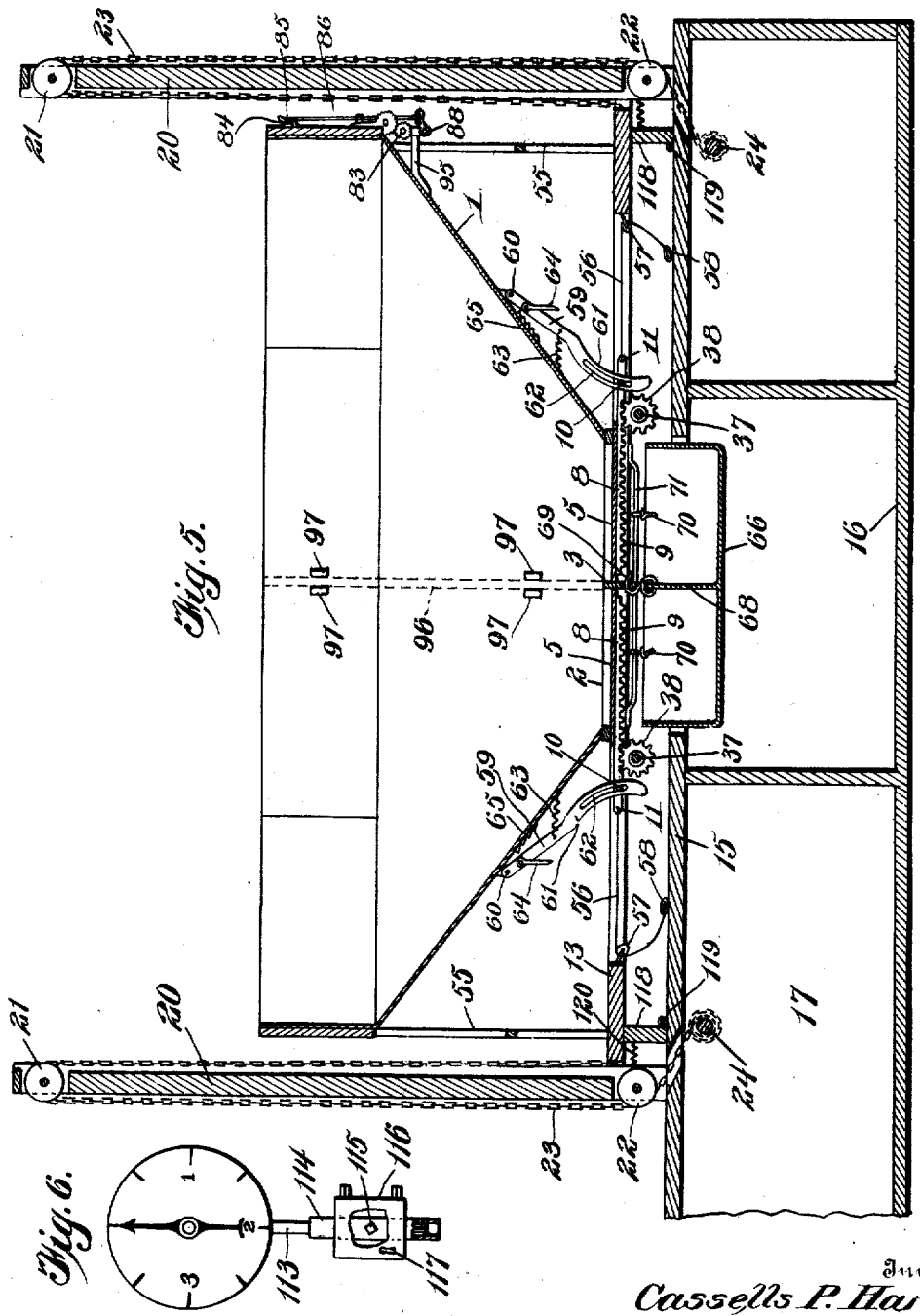

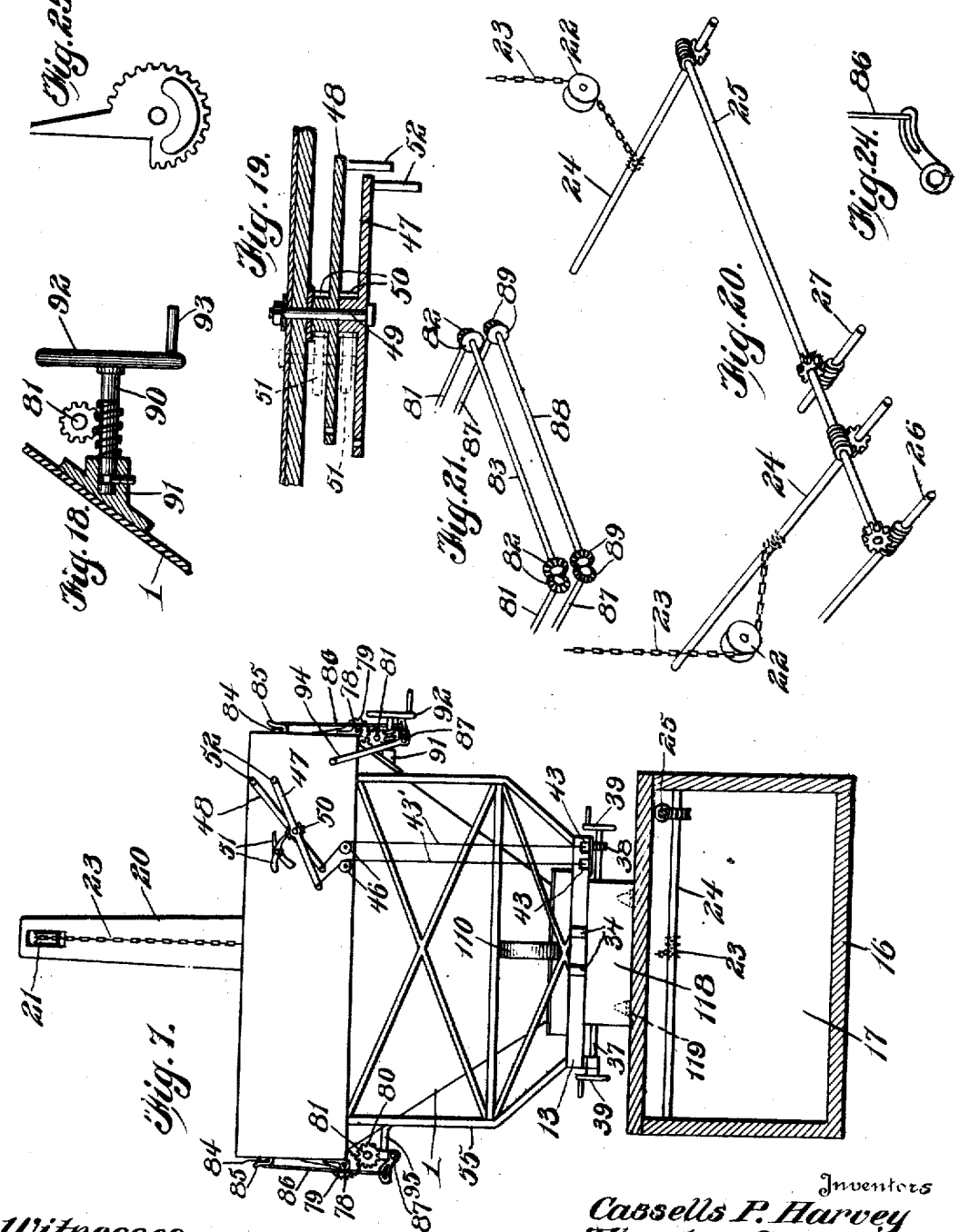

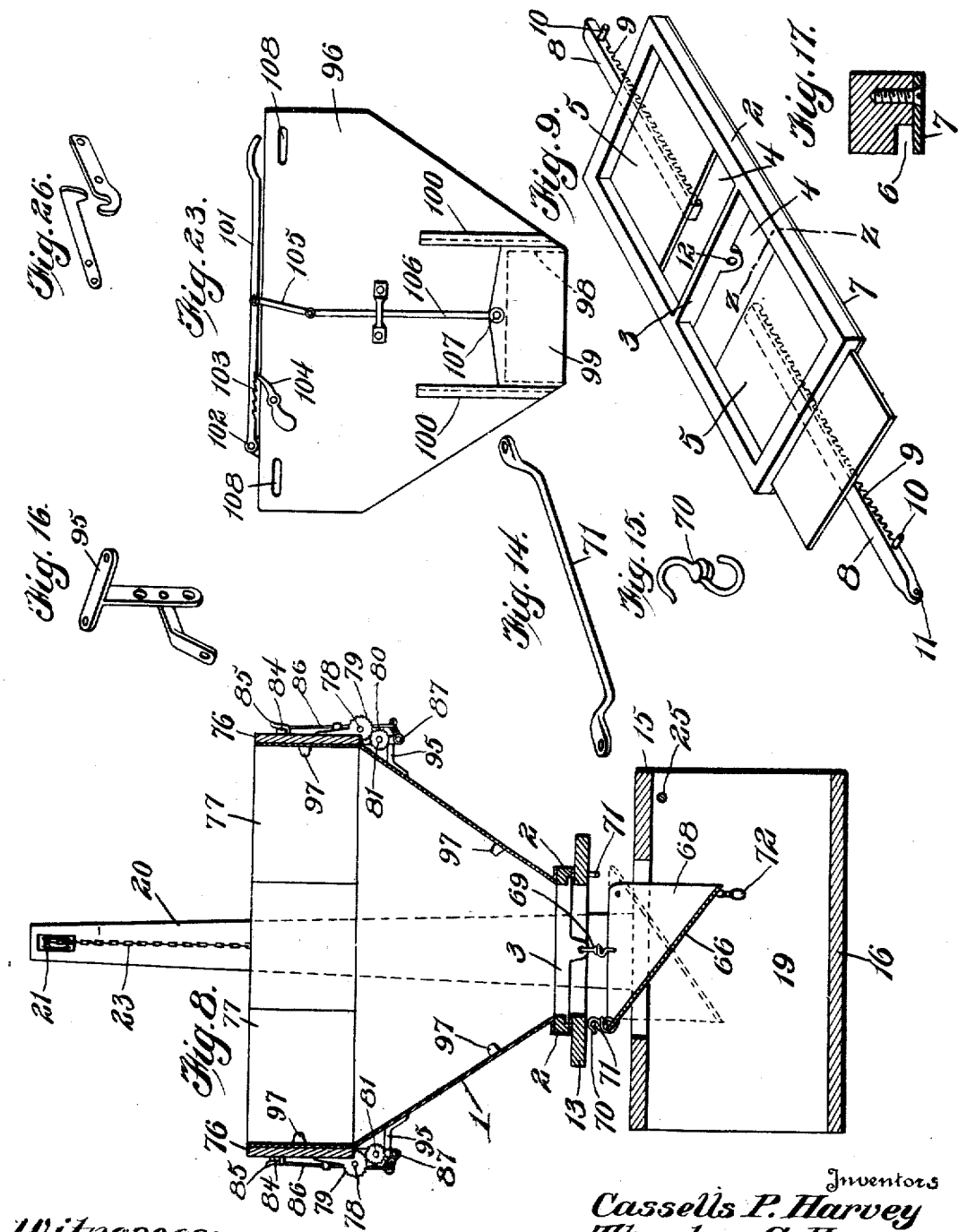

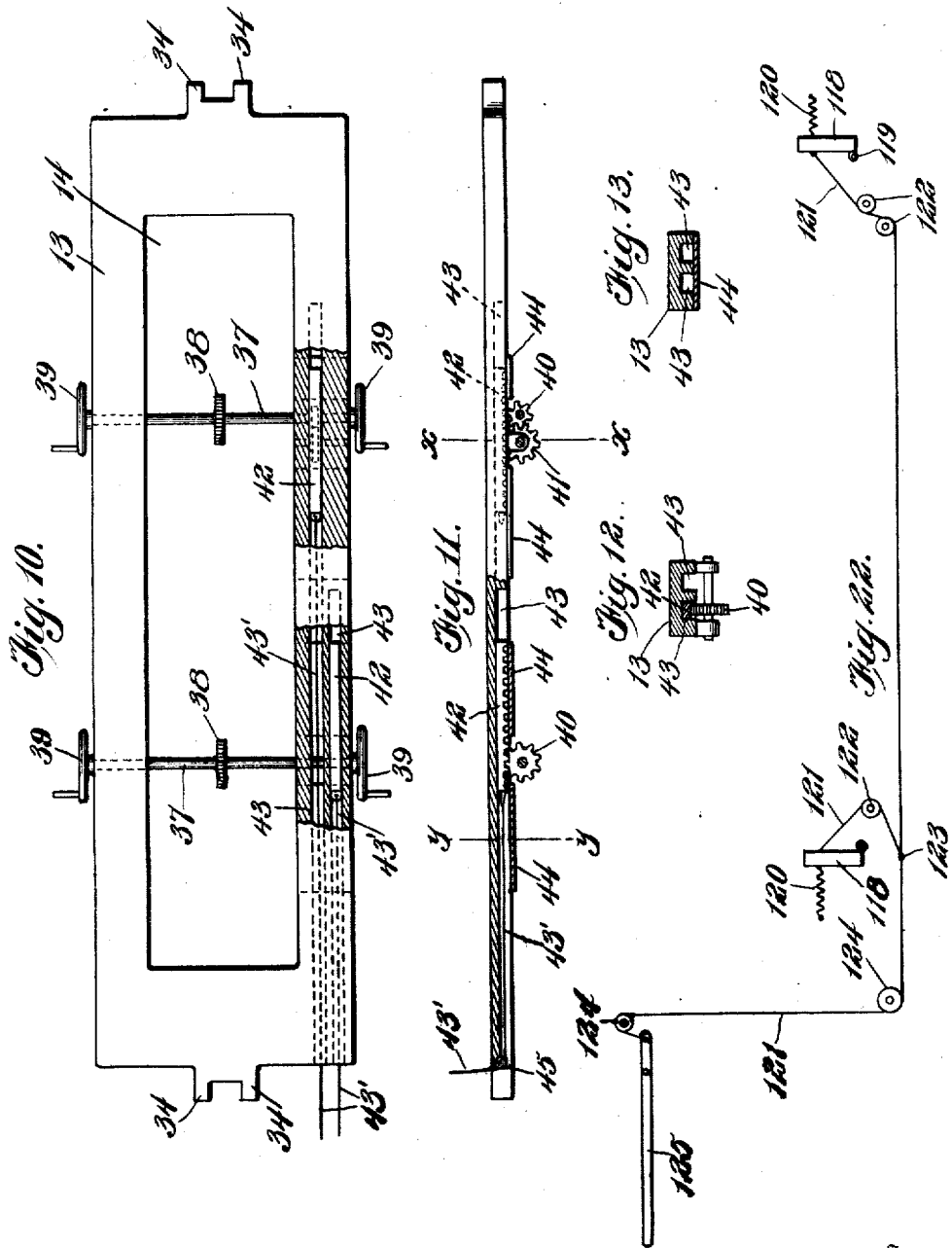

UNITED STATES PATENT OFFICE.

THEODORE C. HARVEY AND CASSELLS P. HARVEY, OF PHILADELPHIA, PENNSYLVANIA; SAID CASSELLS P. HARVEY ASSIGNOR TO SAID THEODORE C. HARVEY.

DUMP-WAGON.

1,263,760.  Specification of Letters Patent.  Patented Apr. 23, 1918.

Application filed March 24, 1917. Serial No. 157,136.

*To all whom it may concern:*

Be it known that we, THEODORE C. HARVEY and CASSELLS P. HARVEY, citizens of the United States, residing at Philadelphia, in the county of Philadelphia and State of Pennsylvania, have invented new and useful Improvements in Dump-Wagons, of which the following is a specification.

This invention relates to dump wagons, the broad object of the invention being to provide a wagon of the class described which is capable of various operations in order to expedite and facilitate the discharge of the load therefrom in a manner most convenient to the operator.

One object of the invention is to provide a dump wagon having a bottom discharge and capable of being automatically unloaded or emptied partially or wholly from either side of the wagon body.

Another object in view is to provide in connection with a body having the characteristics above referred to, means for raising and lowering the body in relation to the truck frame, without interfering with the discharge of the load under the advantageous conditions above enumerated. The body is adapted to be raised or lowered either by hand or motive power.

A further object in view is to provide means operable either from the seat or the ground and whereby a plurality of outlets may be separately or simultaneously operated either with the body elevated or lowered.

Another object in view is to provide means whereby bags or small receptacles may be placed on the platform of the wagon and directly filled by means of a novel arrangement of chute adapted to discharge to either side of the wagon.

Another object in view is to provide either for single or double delivery also to provide means whereby the coal may be directed by means of a chute to coal holes near the curb and to wheel-barrows or other receptacles placed adjacently to the side of the wagon.

Another object in view is to provide means for weighing and registering the weight of the coal and the body, combined with the novel arrangement of riding blocks, which serve to support the body during transportation and prevent injury to the weighing mechanism.

With the above and other objects in view, the invention consists in the novel construction, combination and arrangement of parts, herein fully described, illustrated and claimed.

In the accompanying drawings:—

Figure 1 is a side elevation of a dump wagon embodying the present invention.

Fig. 2 is a plan view of the same.

Fig. 3 is a detail perspective view of the double chute.

Fig. 4 is a similar view of the extension chute.

Fig. 5 is a central vertical longitudinal section through the dump wagon.

Fig. 6 is a detail broken elevation of the weight registering mechanism.

Fig. 7 is a front end elevation of the dump wagon, showing the truck body or double platform arrangement in cross section.

Fig. 8 is a central vertical cross section through the dump wagon.

Fig. 9 is a perspective view of the bottom trap door frame, showing a portion of the door operating means.

Fig. 10 is a top plan view partly in section of the foundation board.

Fig. 11 is a side or edge view of the same partly in section.

Fig. 12 is a transverse section on the line *x—x* of Fig. 11.

Fig. 13 is a transverse section on the line *y—y* of Fig. 11.

Fig. 14 is a detail perspective view of one of the chute supporting rails.

Fig. 15 is a detail perspective view of the chute supporting hook.

Fig. 16 is a detail perspective view of one of the shaft hangers.

Fig. 17 is an enlarged fragmentary cross section on the line *z—z* of Fig. 9.

Fig. 18 is a fragmentary cross section showing a portion of the loading door operating means.

Fig. 19 is a fragmentary horizontal section showing the hand levers for operating the outlet trap doors.

Fig. 20 is a perspective view of part of the hand and motor controlled means for raising and lowering the body of the dump wagon.

Fig. 21 is a similar view showing the operating means between the side and end door operating and latch operating shafts.

Fig. 22 is a diagrammatic view in elevation of the riding blocks and the operating means therefor.

Fig. 23 is a side elevation of the displaceable center or division board.

Fig. 24 is a fragmentary view showing part of the latch operating means.

Fig. 25 is a detail elevation of one of the door operating gears.

Fig. 26 is a detail view of one of the latches and its keeper.

Referring to the drawings 1 designates the wagon body or receptacle for the load, said body being of inverted frusto-pyramidal shape, contracting on all sides from the top to the bottom, or in other words all sides of the body converging toward the bottom and being connected to a bottom frame 2 divided centrally into two substantially equal rectangular discharge outlets by means of a division strip 3 extending transversely across said frame as shown in Fig. 9. Each of the outlet openings 4 of the bottom frame is adapted to be covered and uncovered by one of a pair of slidable trap doors 5 each of which is slidable in rabbets 6 formed in the inner and lower corners of the longitudinal side bars of the frame 2, the doors 5 being retained in place by means of guiding strips 7 secured to the bottom face of the frame as shown in Fig. 17. Each of the doors 5 has fixedly secured thereto a rack bar 8 toothed on its under face as shown at 9 and provided with a laterally extending pin 10 and a terminal eye 11 the purpose of which will hereinafter appear. The division strip 3 is provided with a depending eye 12 the function of which will hereinafter be explained.

The body 1 rests upon and is directly supported by a foundation board 13 which is illustrated in detail in Figs. 10 to 13 inclusive. Said foundation board is formed with an elongated central opening 14 and is movable up and down with the body 1 by means to be described. The truck frame as shown in Fig. 1, comprises a top platform 15 and a bottom platform 16 and the end portions of the truck frame are in the form of boxed-in compartments 17 and 18 leaving an intervening dispensing compartment or space 19 directly below the discharge outlets of the body 1. Extending upwardly from the top platform 15 are front and rear end uprights or standards 20 in which are journaled top and bottom pulleys 21 and 22 respectively and around said pulleys pass body raising and lowering flexible connections 23 shown in the form of chains, said chains being connected at one end to the board 13 and being connected at their opposite ends to chain winding shafts 24 which are geared to a common countershaft 25 in are geared to a cross shaft 26 adapted to be turn geared to a cross shaft 26 adapted to be driven by a motor (not shown) mounted on the truck frame, and also geared to another cross shaft 27 adapted to be turned by hand, the cross shaft 27 being journaled in bearings on the truck frame and having thereon a gear 28 meshing with a pinion 29 on a short transverse shaft 30 having another gear 31 thereon which meshes with and is driven by a pinion 32 on a short shaft provided with an operating hand crank 33. The means just described provides for raising and lowering the body 1 by hand, while the operator is standing on the ground beside the wagon.

As shown in Figs. 2 and 10, the foundation board 10 is provided at the opposite ends thereof with guiding lugs or ribs 34 and the standards or uprights 20 are provided on their inner faces with guiding ribs 35 which are engaged by the lugs or ribs 34 of the foundation board as the latter is raised and lowered. The ribs 35 and lugs 34 are arranged to leave an intervening space or channel 36 for the chains 23 as shown in Fig. 2.

The means for opening the bottom doors 5, comprises a pair of shafts 37 extending transversely of the foundation board 13 as shown in Figs. 10 and 11, said shafts 37 carrying pinions 38 which mesh with the teeth 9 of the rack bars 8 shown in Fig. 9. On their opposite ends, the shafts 37 have hand wheels 39 (see Fig. 10) thus enabling the doors 5 to be opened from two points on each side of the machine. The shafts 37 are journaled in bearings in the foundation board 13 and in addition to the pinions 38, they are provided with other pinions 40 one of which meshes with a reverse motion pinion 41 (see Fig. 11). One of the pinions 40 and the pinion 41, mesh with slidable rack bars 42 working in grooves 43 in the bottom of the foundation board 13 as indicated in Figs. 11 and 12, the rack bars 42 being held in place by a cover strip 44 secured to the under side of the foundation board.

The means for operating the bottom doors from the driver's seat, comprises cables 43' which are terminally attached to the rack bars 42 as shown in Fig. 10. Said cables 43' extend around pulleys 45 (see Fig. 11) and upwardly around other pulleys 46 (see Fig. 7) to a pair of hand levers 47 and 48 mounted on a stud shaft 49 projecting from the front end of the body 1 as shown in Figs. 7 and 19. Each of said levers carries a ratchet wheel 50 adapted to be engaged by one of a pair of detents 51 on the body 1, and one of said levers is longer than the other as shown in Figs. 7 and 19, each lever being terminally provided with a hand grip 52. This enables either lever to be operated independently of the other or both levers simultaneously. As a result the outlet doors 5 may be operated simultaneously or independently and this is accomplished by the driver without leaving his compartment. The front and rear ends of the body 1 are sustained by skeleton end supports 55 which extend from the foundation board 13 upwardly to the top sill of the body 1 below the bottoms of the loading doors hereinafter described.

Another means for operating the outlet doors 5 consists of flexible cables 56 terminally attached to the eyes 11 of the rack bars 8 and passing around pulleys 57 on the foundation board 13 as shown in Fig. 5 where they are provided with terminal hand grips 58. This enables the operator while standing on the ground to operate the outlet doors whether the body is elevated or lowered.

The means for closing the outlet doors 5 embodies, as shown in Figs. 1 and 5, a pair of thrust arms 59 each pivotally mounted at 60 on the body 1 and having a curved portion 61 formed with an arcuate slot 62 which engages the pin 10 of the adjacent rack bar 8 as shown in Fig. 5. A contractile spring 63 connects each arm 59 with the body 1 and serves by means of the arm 59 to press the respective door 5 toward its closed position after the door opening means have been relaxed. Each of the thrust arms 59 carries a detent 64 to engage a rack face 65 on the body 1 when it is desired to hold the doors 5 open for a considerable period of time, as when discharging the entire load in one operation.

66 designates a double chute substantially triangular in cross section and comprising two chute-ways 67 divided from each other by the partition 68 to the edge of which is attached a swivel hook 69 which is removably fitted in the eye 12 of the bottom frame 2. The chute 66 also carries other swivel eyes 70 adapted to engage one of a pair of chute supporting rails 71, one of which is illustrated in the detail view Fig. 14. The construction of the hooks 69 and 70 is illustrated in detail in Fig. 15. It will be apparent that the chute 66 may be reversed so as to discharge toward either side of the dump wagon and by having two compartments, the discharge may be made through either of said compartments or simultaneously through both according to the manipulation of the outlet doors 5. The chute 66 is also provided with short coupling chains 72 to allow an extension chute 73 to be attached to the chute 66. The main body of the chute 73 is illustrated as narrower than the double chute 66 but is provided with a flared receiving portion 74 to embrace both compartments of the double chute 66 and the chute 73 is provided with attaching hooks 75 to engage the chains 72, thus enabling the chute and the extension chute to be readily associated and disconnected. As indicated in Figs. 1 and 5, the chute 66 is disposed in the dispensing compartment 19 of the truck frame. This enables bags, buckets or other receptacles to be placed on the bottom platform 16 so that they may be individually filled by opening either one or both of the bottom outlet doors 5. Fig. 8 indicates the two reverse positions of the chute 66 by full and dotted lines, also the manner of supporting said chute in relation to the bottom frame and foundation board.

The body 1 comprises two side loading doors 76 and rear end loading doors 77 said doors standing vertically when closed and being located above the top of the frusto-pyramidal portion of the body 1. The side doors 76 are fixedly connected to hinge rods 78 having gears 79 thereon which mesh with other gears 80 on door operating shafts 81; the said shafts 81 being operatively connected by gears 82 to an end door operating shaft 83 operatively connected to the end door 77 in the same manner that the shafts 81 are operatively connected with the side doors 76. This insures the simultaneous opening and closing of the side and end doors.

In connection with each of the side and end doors, pivoted latches 84 are provided, the same engaging keepers 85 on the doors. The latches 84 are operated by flexible connections 86 from two side latch operating shafts 87 and an end latch operating shaft 88 as shown in Fig. 21, the shafts 87 and 88 being operatively connected by gears 89 for simultaneous operation. One of the side shafts 81 is operated, as shown in Fig. 18, by a worm shaft 90 journaled in the bearing 91 on the body 1 and having fast on its outer end a hand wheel carrying a handle 93. One of the latch operating shafts 87 has fast on the front end thereof an operating lever or crank arm 94 within reach of the operator in his compartment, who may thereby unlatch all of the loading doors, open said loading doors, and again close and latch the same. This may be accomplished either when the body is elevated or lowered. 95 designates one of a series of bearing brackets for the shafts 81 and 87, one of said brackets being illustrated in detail in Fig. 16 and the same being bolted to the body 1.

96 designates a center board or division board, the same being removably inserted between holding lugs 97 on the inside of the body 1 as shown for example in Figs. 2 and 5. This center board 96 is arranged directly over the division strip 3 of the bottom frame 2 and embodies a gate-way 98 in the bottom thereof which is controlled by a vertically slidable gate 99 movable in guides 100 on the board 96. The gate 99 is opened and closed by means of a hand lever 101 pivotally mounted at 102 on the top edge of the board 96 and having a rack face 103 adapted to be engaged and held by a detent 104. The lever 101 is connected by a link 105 to a gate opening and closing rod 106 attached to the gate 99 at 107. Hand holes 108 are formed in the board 96 to facilitate placing said board in position and removing the same therefrom.

The foundation board 13, when in its lowered position, is yieldingly supported by weighing springs 109 in turn supported by the platform 15 as shown in Fig. 1. The weighing mechanism comprises a stationary dial 110, an indicating hand 111 carried by a rotatable arbor 112 actuated by a vertically extending and movable rack bar 113. As shown in Fig. 6, the rack bar 113 comprises a tubular extensible member 114 which is adjustable longitudinally of the rod or bar 113 by means of a set screw 115. This enables the length of the actuating member of the weight registering or indicating mechanism to be adjusted in length. Said rod or bar 113 passes through a lock box 116 the door of which is formed with a key hole 117. After the door of the lock box has been locked, unauthorized persons are prevented from tampering with the adjustment of the register actuating member 113. In this way the proper official may adjust the weight registering mechanism and then lock and seal the same.

When the wagon is being driven from place to place, in order to prevent injury to the weighing mechanism, the foundation board 13 is supported upon a plurality of riding blocks 118 which are hinged at 119 to the top platform 15. The blocks 118 are normally held in their supporting positions as shown in Figs. 1, 5 and 22 by means of springs 120. Said blocks are moved away from their body supporting positions by means of flexible connections or cables 121 passing around pulleys 122, joined together at 123 and then extending around other guide pulleys 124 to a hand lever 125, which, as shown in Fig. 1 is mounted at one side of the driver's seat 126, said lever being of the thumb latch type as shown so that the riding blocks 118 may be held in their non-useful position during the weighing of the load. When the lever 125 is relaxed, the springs 120 return the riding blocks to their useful positions.

From the foregoing description taken in connection with the accompanying drawings it will now be seen that we have produced a combination wagon by which the load may be weighed, the vehicle may be disposed with either side parallel to the curb, the body dumps from the bottom, delivers to chutes extending from either side or both sides, the body is self-emptying either in an elevated or depressed position, the body may be raised and lowered by hand or by motor, the outlet doors may be operated from the seat or from the ground, separately or simultaneously with the body elevated or lowered. All of the loading doors may be operated simultaneously from the seat, the riding blocks may be operated simultaneously from the seat, bags or other receptacles may be filled from the platform; the center board allows for single or double delivery; coal or other material may be delivered to coal holes near the curb or directly into wheel barrows or the like, and the weighing register or indicator may be adjusted and thereafter locked and protected.

The weighted lower ends of the hinge gears 79 helps to balance the loading doors as they are moved toward open and closed positions. The body cannot drop unless both elevating chains or cables break simultaneously. The center of gravity admits of a considerable range of inclination of the dump wagon while the body is partly or wholly elevated.

We claim:—

1. In a dump wagon, the combination of a vertically movable body having downwardly converging walls, a bottom frame to which said walls are connected having a plurality of outlet openings, independently operable outlet doors normally closing said openings, and door operating connections therefor comprising rack and pinion mechanism operable by a person standing on the ground, and also controlled from the operator's compartment for shifting said doors.

2. In a dump wagon, the combination of a vertically movable body having downwardly converging walls, a bottom frame to which said walls are connected having a plurality of outlet openings, independently operable outlet doors normally closing said openings, door operating connections therefor controllable from the operator's compartment, and spring thrust arms serving to automatically close said outlet doors and yieldingly admit of the opening movement thereof.

3. In a dump wagon, the combination of a vertically movable body having downwardly converging walls, a bottom frame to which said walls are connected having a plurality of outlet openings, independently operable outlet doors normally closing said openings, door operating connections therefor controllable from the operator's compartment, spring thrust arms serving to automatically close said outlet doors and yieldingly admit of the opening movement thereof, and means for latching said outlet doors in an open or partially open position.

4. In a dump wagon, the combination of a vertically movable body having downwardly converging walls, a bottom frame to which said walls are connected having a plurality of outlet openings, independently operable outlet doors normally closing said openings, spring thrust means for closing said doors, and door operating rack and pinion mechanism controllable from the operator's compartment, said door operating means enabling either of said outlet doors to be operated independently of the other.

5. In a dump wagon, the combination of a vertically movable body having downwardly converging walls, a bottom frame to which said walls are connected having a plurality of outlet openings, independently operable outlet doors normally closing said openings, door operating connections therefor controllable from the operator's compartment, a double chute embodying two compartments the floors of which incline in the same direction and are arranged under said bottom frame, and means on said bottom frame and chute whereby the latter may be supported by said bottom frame to discharge toward either side of the wagon.

6. In a dump wagon, the combination of a vertically movable body having downwardly converging walls, a bottom frame to which said walls are connected having a plurality of outlet openings, independently operable outlet doors normally closing said openings, door operating connections therefor controllable from the operator's compartment, a division strip extending transversely of said bottom frame and body, a division board removably fitted in the body in vertical alinement with said division strip and provided with a gate-way in the bottom thereof, a gate controlling said gate-way, and operating means for said gate mounted on said division board.

7. In a dump wagon, a truck frame, a load carrying body, a foundation board on which said body is supported, elevating and lowering means for said foundation board, riding blocks hinged to the truck frame and underlying and adapted to support said foundation board, means for yieldingly holding said blocks in supporting position, and means controlled from the operator's compartment for moving said riding blocks to non-supporting position.

8. In a dump wagon, a truck frame, a load carrying body, a foundation board on which said body is supported, elevating and lowering means for said foundation board, riding blocks hinged to the truck frame and underlying and adapted to support said foundation board, means for yieldingly holding said blocks in supporting position, means controlled from the operator's compartment for moving said riding blocks to non-supporting position, weighing mechanism embodying springs supported by the truck frame and adapted to yieldingly support said foundation board, a weight indicator carried by a foundation board and embodying a longitudinal extensible actuating member, means for adjusting the length of said actuating member, and a lock box inclosing the last named means.

9. In a dump wagon, the combination of a truck frame, a load carrying body, a foundation board on which said body is supported, loading doors forming hinged top extensions of said body, and a lever and connections controlled from the operator's compartment for swinging said loading doors toward and from their closed positions.

10. In a dump wagon, the combination of a truck frame, a load carrying body, a foundation board on which said body is supported, loading doors forming hinged top extensions of said body, means controlled from the operator's compartment for swinging said loading doors toward and from their closed positions, and a lever and connections controlled from the operator's compartment for latching and unlatching said loading doors.

11. In a dump wagon, the combination of a truck frame, a load carrying body, a foundation board on which said body is supported, side and end loading doors having a hinged connection with the top of said body, side and end shafts extending horizontally beneath said loading doors and geared thereto and geared to each other, and means controlled from the operator's compartment for simultaneously and equally turning said shafts.

12. In a dump wagon, the combination of a truck frame, a weight carrying body, a foundation board on which said body is supported, side and end loading doors having a hinged connection with the top of said body, side and end shafts extending horizontally beneath said loading doors and geared to each other, and latches for said loading doors operatively connected with said shafts.

In testimony whereof we affix our signatures.

THEODORE C. HARVEY.
CASSELLS P. HARVEY.